US012657250B2

(12) United States Patent (10) Patent No.: US 12,657,250 B2

Welsford et al. (45) Date of Patent: Jun. 16, 2026

(54) SYSTEMS AND METHODS FOR INTERCONNECTING DIRECTORIES

(71) Applicant: VOCALINK INTERNATIONAL LIMITED, London (GB)

(72) Inventors: Abigail Lindsey Welsford, Sidcup (GB); Boy Anthony Kuhne, London (GB); Christopher Paul Kendall, Leighton Buzzard (GB); David Andrew Bray, Rickmansworth (GB); Manish Murarka, London (GB); Stephen Richard Wright, Uxbridge (GB)

(73) Assignee: VOCALINK INTERNATIONAL LIMITED, London (GB)

( * ) Notice: Subject to any disclaimer, the term of this patent is extended or adjusted under 35 U.S.C. 154(b) by 193 days.

(21) Appl. No.: 18/243,535

(22) Filed: Sep. 7, 2023

(65) Prior Publication Data

US 2024/0086483 A1     Mar. 14, 2024

Related U.S. Application Data

(60) Provisional application No. 63/406,542, filed on Sep. 14, 2022.

(51) Int. Cl.
G06F 16/9538 (2019.01)
H04L 9/30 (2006.01)

(52) U.S. Cl.
CPC ............ G06F 16/9538 (2019.01); H04L 9/30 (2013.01)

(58) Field of Classification Search
CPC .............................. G06F 16/9538; H04L 9/30
See application file for complete search history.

(56) References Cited

U.S. PATENT DOCUMENTS

| | | | |
|---|---|---|---|
| 10,454,690 B1 | 10/2019 | Popoveniuc et al. | |
| 10,728,044 B1 | 7/2020 | Melo et al. | |
| 12,224,991 B1 | 2/2025 | Joglekar et al. | |
| 2003/0070070 A1 | 4/2003 | Yeager et al. | |
| 2007/0073621 A1 | 3/2007 | Dulin et al. | |
| 2009/0193443 A1* | 7/2009 | Lakshmanan ........... | G06F 9/544 |
| | | | 719/330 |
| 2011/0289508 A1* | 11/2011 | Fell ..................... | H04L 67/1004 |
| | | | 718/105 |
| 2012/0216035 A1 | 8/2012 | Leggette et al. | |
| 2013/0117560 A1 | 5/2013 | Resch et al. | |
| 2014/0040415 A1* | 2/2014 | Mathew .............. | G06F 16/9574 |
| | | | 709/213 |

(Continued)

*Primary Examiner* — Yonas A Bayou

(74) *Attorney, Agent, or Firm* — Harness, Dickey & Pierce, P.L.C.

(57) ABSTRACT

Systems and methods are provided for interconnecting proxy directories, through core proxy services. One example computer-implemented method includes receiving, by a first proxy service core computing device, from a participant, a proxy lookup request, where the proxy lookup request includes a proxy and based on one or more routing rules, submitting the proxy lookup request to a second proxy service core computing device. The method also includes receiving, by the first proxy service core computing device, from the second proxy service core computing device, a proxy lookup response, which includes account data linked to the proxy, and returning the proxy lookup response, to the participant, in response to the proxy lookup request.

12 Claims, 10 Drawing Sheets

(56)         References Cited

U.S. PATENT DOCUMENTS

| | | | |
|---|---|---|---|
| 2015/0262160 A1* | 9/2015 | Hursta | G06Q 30/0261 |
| | | | 705/14.51 |
| 2015/0278808 A1 | 10/2015 | Dulin et al. | |
| 2016/0125370 A1* | 5/2016 | Grassadonia | G06Q 20/0855 |
| | | | 705/39 |
| 2016/0180299 A1* | 6/2016 | Sandraz | G06Q 20/027 |
| | | | 705/44 |
| 2017/0093587 A1 | 3/2017 | Glisson | |
| 2017/0302755 A1* | 10/2017 | Mathew | G06F 16/9574 |
| 2019/0036711 A1 | 1/2019 | Qiu | |
| 2019/0363896 A1 | 11/2019 | Finlow-Bates | |
| 2020/0028842 A1 | 1/2020 | Leiserson et al. | |
| 2020/0076807 A1 | 3/2020 | Driever et al. | |
| 2020/0275272 A1 | 8/2020 | Montemurro et al. | |
| 2020/0311722 A1* | 10/2020 | Ginger | H04L 45/54 |
| 2020/0322332 A1 | 10/2020 | Haque et al. | |
| 2021/0083882 A1 | 3/2021 | Venable, Sr. | |
| 2021/0135884 A1 | 5/2021 | Theodorou et al. | |
| 2021/0247731 A1 | 8/2021 | Poluri et al. | |
| 2021/0288822 A1 | 9/2021 | Sorensen et al. | |
| 2022/0393884 A1 | 12/2022 | Panchamia et al. | |

* cited by examiner

SYSTEMS AND METHODS FOR INTERCONNECTING DIRECTORIES

CROSS-REFERENCE TO RELATED APPLICATION

This application claims the benefit of, and priority to, U.S. Provisional Application No. 63/406,542, filed on Sep. 14, 2022. The entire disclosure of the above-referenced application is incorporated herein by reference.

FIELD

The present disclosure is generally directed to systems and methods for interconnecting directories, through core proxy services.

BACKGROUND

This section provides background information related to the present disclosure which is not necessarily prior art.

Data structures are known for storing data, whereby the data may be retrieved in response to a request for the particular data. Federated storage provides for a collection of different data structures, each including the same or different data. When a request for data is received, the federated storage identifies the location of the data among the different data structures, retrieves the data and then returns the data. In this manner, the federated storage includes a central custodian, which manages the storage of the data across the data structures and acts to locate specific data in response to the request.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Data structures may include directories of specific data, such as, for example, identifying data and proxies specific to the identifying data. The data structures, in turn, may be separate in the context of geographic location, ownership and/or control, such that access to particular data involves a particular data structure. It is problematic, in various implementations, though, to identify the specific data structure, for a given request, especially when the data structure must be identified from numerous different data structures associated with different parties and/or located in different jurisdictions.

Uniquely, the systems and methods herein provide for interconnecting proxy directories, through one or more proxy service cores, whereby requests are routed to directories including data responsive thereto. In this manner, accessibility and/or usability of proxies is enhanced, potentially, with limited information needed and/or required about the proxies and/or authorities linking the proxies to account data, etc. in order to identify/retrieve the data responsive to the requests.

Figure 1:
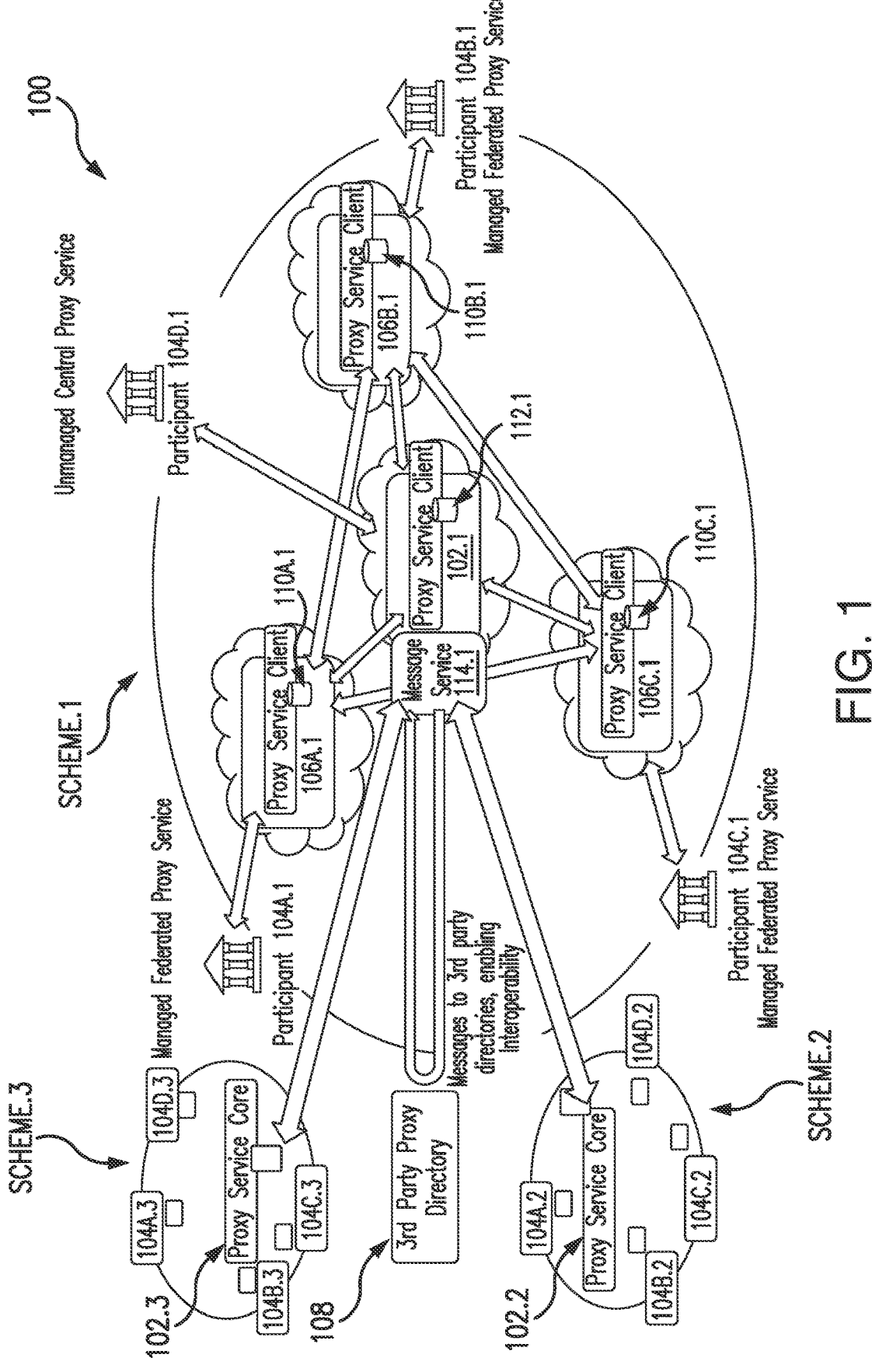
FIG. 1 illustrates an example system of the present disclosure suitable for use in registration of a proxy for an account, where a proxy reference address is stored.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, distribution of directories in or between different regions, relations among participants, privacy concerns and/or or requirements, etc.

The illustrated system 100 generally includes a proxy service core 102 (e.g., 102.1, 102.2, 102.3, etc.), multiple participants 104A-104D (e.g., 104A.1, 104A.2, 104A.3, etc.), multiple proxy service clients 106A-106C (e.g., 106A.1, etc.), and a third party (or 3$^{rd}$ party) proxy directory 108, each of which is coupled to one or more networks. The network(s) (as indicated by the arrowed lines in FIG. 1) may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof, etc.

In this example embodiment, the participant 104A, for example, includes a banking institution, or bank or other financial institution, which is associated with various users (or customers) (not shown). In particular, the participant 104A is configured to issue accounts to users, and the accounts are each associated with a unique account identifier (e.g., account number (alone or in combination with a routing number), primary account number (PAN), virtual account number, wallet identification number, etc.), alone or in combination with expiration dates, verification codes, etc. (broadly, account data). Account data should be understood to be any identifying data associated with an account, from which the account may be identified, based on the account data, alone or in combination with other data. The accounts may be credit accounts, debit accounts, prepaid accounts, checking accounts, or other types of financial/currency accounts, which are issued by the participant 104A, for example, to fund a transaction (e.g., purchase, money transfer, etc.) by the various users. In connection therewith, the participant 104A is configured to link the account data to a proxy. A proxy may include, for example, data known to the user, and unique to the user. In this example, the proxy includes a phone number, or more specifically, a mobile phone number, but may include, in other examples, an email address, government-issued number/identifier, account verification information, or other numeric, alpha or alphanumeric string, etc. In general, the proxy may include any type of alias linked to the account data, etc.

In connection therewith, the participant 104A is configured, by the proxy service client 106A, to store the proxy in a proxy directory (i.e., as a federated directory) in a database 110A (e.g., 110A.1, etc.), as shown in FIG. 1. The participant 104A is configured to associate or link the proxy in the proxy directory to account data for the user, where a registry (a data structure also stored in the database 110A) indicates the specific proxy reference address of the proxy in the directory. In order to extend the usability of the proxy (e.g., to other participants, etc.), the participant 104A is further configured, by the proxy service client 106A, to submit the proxy to the proxy service core 102 for registration. The proxy service core 102, in turn, is configured to store the proxy in a database 112 (e.g., database 112.1, etc.), in association with the participant 104A (e.g., a proxy reference address/identifier associated with the participant 104A, etc.), in a local registry in the database 112. Notably, however, the account data is not submitted by the participant 104A to the proxy service core 102 as part of registration in this embodiment, whereby the proxy service core 102 is configured to query the participant 104A, to determine the account data that is linked to the proxy, in response to a request including the proxy (e.g., as submitted by a proxy requestor, etc.). In this manner, the participant 104A, by the proxy service client 106A, is configured to manage the proxy directory included in the database 110A (e.g., as a federated service, etc.).

It should be appreciated that in this example embodiment, the participants 104B and 104C are configured similar to participant 104A, as it pertains to the proxies. As such, the participants 104B and 104C include databases 110B, 110C, respectively (e.g., 110B.1, 110C.1, etc.), which includes a proxy directory of proxies registered with the proxy service core 102 and linked to account data of the respective participant.

Also in this example embodiment, the participant 104D is distinct. Rather than manage the proxy directory itself, the participant 104D relies on the proxy service core 102 to manage the proxy directory to link proxies to accounts issued by the participant 104D. As such, the participant 104D is configured to, as part of registration, submit not only proxies to the proxy service core 102, but also the account data to be linked to the proxies. The proxy service core 102, in turn, is configured to store the proxy and the account data (linked together), in a proxy directory of the database 112, and update the local registry in the database 112 to reflect the registration of the proxy. In this manner, the proxy service core 102 is enabled to manage the proxy directory for proxies specific to the participant 104D, and in particular, to identify account data linked to a proxy, as linked in the proxy directory in the database 112, without querying the participant 104D.

It should be appreciated that the four participants 104A-104D are included in FIG. 1 for purposes of illustration, and that there may be a different number of participants in other embodiments.

In addition in FIG. 1, two different schemes are illustrated, each with a respective proxy service core. The proxy service core 102.1 and the participants 104A.1-104D.1 are bound together by a circle, which is representative of a first scheme, or SCHEME.1. The system 100 also includes a second scheme, or SCHEME.2, and a third scheme, or SCHEME.3, which are similar to SCHEME.1. In connection therewith, for purposes of illustration, each of the parts of SCHEME.1 should be understood to be functionally and/or generally the same in SCHEME.2 and SCHEME.3 (yet different, in that, for example, the participant 104A.1 is different than participant 104A.2 and the participant 104A.3). That said, it should be appreciated that descriptions of the proxy service core 102, for example, are generic to proxy service core 102.1 and 102.2 and 102.3, while description of proxy service core 102.1 or proxy service core 102.2 or the proxy service core 102.3 will often be specific to that proxy service core. The same applies to the descriptions of the participants 104A-104C.

Each scheme may be specific to a proxy service core and may be defined, for example, by a particular geographic boundary or governmental or geopolitical boundary (e.g., country, state, territory, city, postal code), or limited to a particular type of participant(s) or service (e.g., for which a proxy is requested, etc.). It should also be appreciated that the proxy service cores 102.1 and 102.2 are configured to communicate with one another, as indicated by the arrowed line in FIG. 1. In general, the system 100 may provide a global solution for proxy lookup, where the schemes (e.g., SCHEME.1, SCHEME.2, SCHEME.3, etc.) are each specific to a region such as, for example, a country or portion of a country. In this manner, each region and/or country may be associated with a scheme, whereby each of the schemes operates consistent with the description herein. For example, where one SCHEME.1 is the United States and SCHEME.2 is the United Kingdom and SCHEME.3 is India, as should be apparent from FIG. 1, the schemes are coupled in communication to provide proxy lookup across the different countries.

The proxy service core 102 is also configured to orchestrate messages within the system 100 (e.g., via routing rules (or routing logic), etc.). In particular, the proxy service core 102 is configured to compile and/or route the messages (e.g., determine where to route the messages, etc.) within the system 100, for example, to particular participants 104A-104D, to other parts of the system 100, etc.

The proxy service core 102 is further configured to communicate with the third party proxy directory 108. The third party proxy service 108 includes a proxy directory for accounts, which, like above, includes proxies linked to account data. That said, in some examples the third party proxy directory 108 may include, for instance, any directory (e.g., a single unfederated directory, etc.), which is connected (or otherwise in communication with) the proxy service core 102, but that is not controlled in whole or in part by the proxy service core 102 (e.g., it may not be indexed and/or does not include routing rules, etc.). To this point, the third party proxy directory 108 may include a legacy directory from a payment network (e.g., that is managed on behalf of a scheme in the same or a different country, etc.) or a directory managed for a third party organization (e.g., such as a scheme or mobile payments provider such as YAPE, PLIN, Zelle, etc.; etc.). In other examples, the third party proxy directory 108 may include a federated directory, for instance, where the directory 108 implements one or more client service as identified, described, or eluded to herein.

In this example embodiment, the proxy service core 102 is associated with a message service 114 (e.g., service 114.1, etc.), which is configured to create, compile, transmit, transform, etc., messages between the proxy service core 102 and either the third party proxy directory 108 or another service region (and in particular, another proxy service core (e.g., the proxy service core 102.1 may be configured to create, compile, transmit, etc., messages to the proxy service core 102.2 and vice versa, etc.), etc.). The message service 114 is further configured to transform message from one format (e.g., ISO 20022 message, etc.) to another defined format (e.g., a proprietary format, etc.), which is different than the original format. That said, the message service 114 may be configured to communicate and/or transform message according to any suitable format, as required or desired for the proxy service core 102 to perform as described herein.

In the illustrated embodiment, the parts of the system 100 are each configured (e.g., by executable instructions, etc.) to perform operations, as explained below with reference to FIGS. 3-8.

Figure 2:
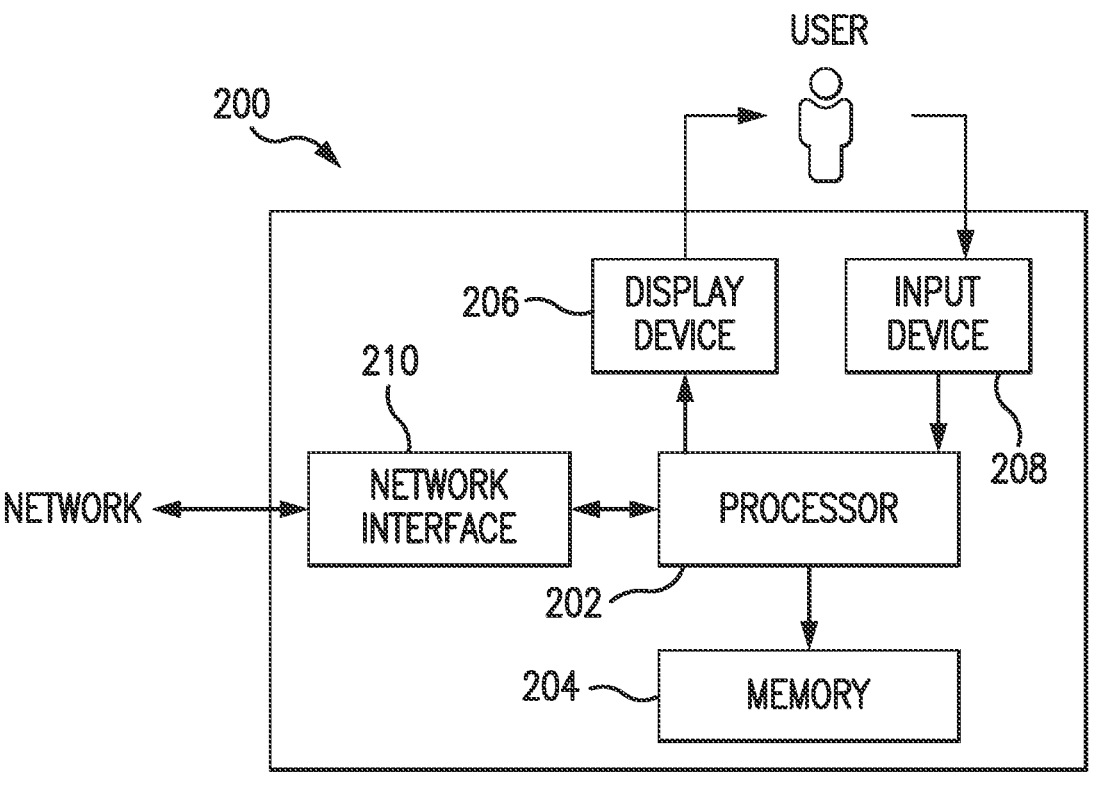
FIG. 2 is a block diagram of an example computing device that may be used in the system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the proxy service core 102, the participants 104A-104D, the proxy service clients 106A-106C, the third party proxy service 108, the databases 110, 112, and the message service 114, etc., may be considered, may include, and/or may be implemented in a computing device consistent with the computing device 200, coupled to (and in communication with) the one or more networks of the system 100. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, routing logic, proxies, account data, proxy directories, message formats/formatting, sequence stacks, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, method 400, method 500, method 600, method 700, method 800 etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 and an input device 208.

The presentation unit 206 is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., account data, proxies, etc.), etc. And, various interfaces may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

The input device 208 receives inputs from the user 112 (i.e., user inputs) of the computing device 200 such as, for example, inputs to register/define a proxy for an account, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different networks herein and/or with other devices described herein. In some example embodiments, the computing device 200 may include the processor 202 and one or more network interfaces incorporated into or with the processor 202.

Figure 3:
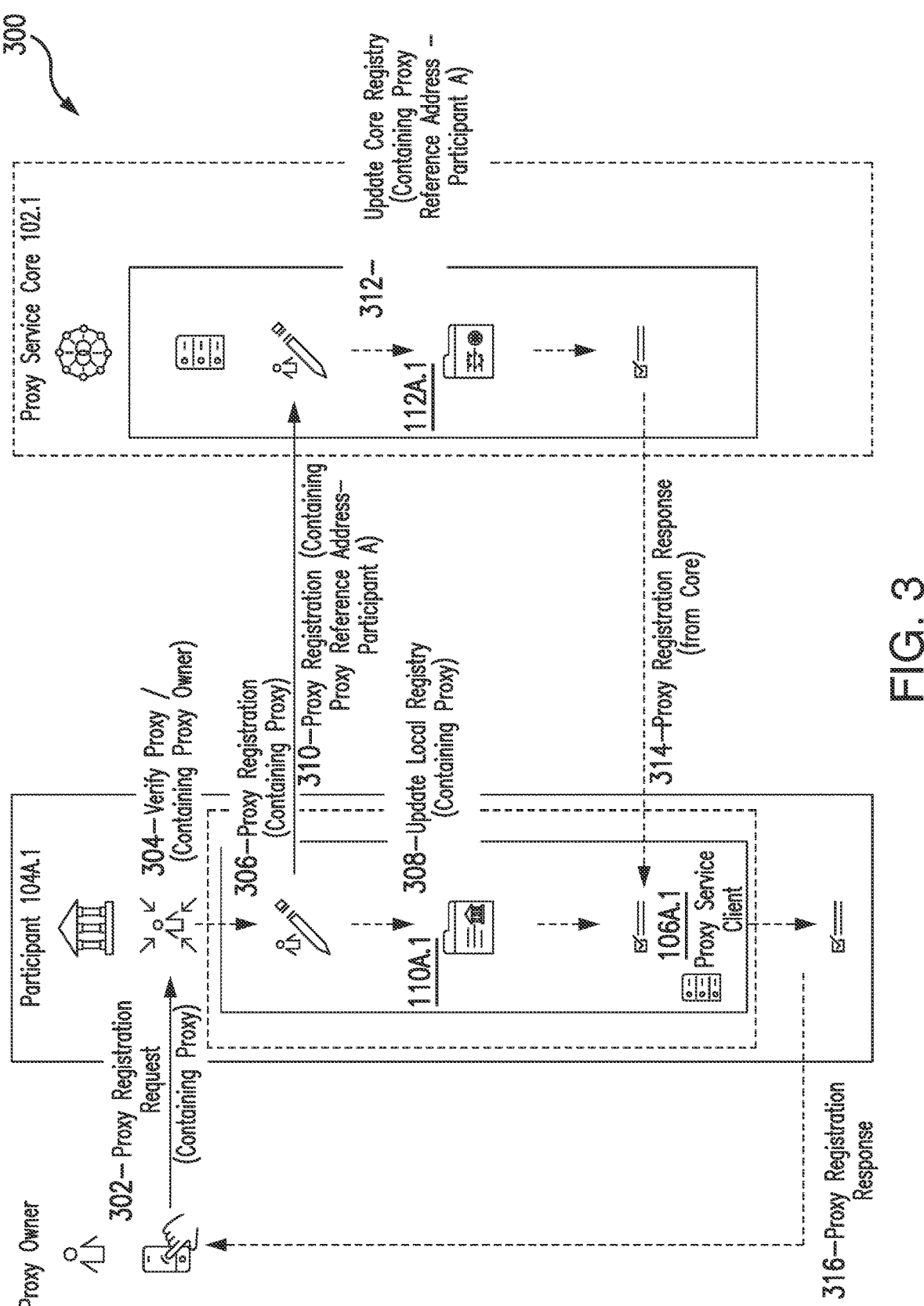
FIG. 3 illustrates an example method, which may be implemented in connection with the system of FIG. 1, for use in registering a proxy for an account.

FIG. 3 illustrates an example method 300 for use in registration of a proxy for an account. The example method 300 is described as implemented in system 100, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 300.

Initially, it should be understood that the proxy owner (or user), in this example, is associated with an account, issued by the participant 104A.1 (as part of SCHEME.1), and requests a proxy, such as, for example, the owner's mobile phone number, etc., to be linked to the account (e.g., via an application installed on the user's mobile phone, via a web browser, etc.). Consistent therewith, the proxy owner submits a proxy registration request, at 302, to the participant 104A.1. In connection therewith, account data relating to the user's account is stored at the participant 104A.1 (e.g., in a directory at the participant 104A.1, etc.) along with the proxy (e.g., also in the directory at the participant 104A.1, etc.).

The participant 104A.1 verifies the proxy and confirms the owner of the proxy, at 304. The verification may include any form of searching or lookup associated with the proxy (e.g., to confirm it is not already registered, to confirm that it has a valid format, etc.), and may include confirmation/ verification of the ownership of the proxy, for example, by a profile associated with the owner (e.g., associated with the account issued by the participant 104A.1, etc.), or otherwise. In at least one embodiment, the participant 104A.1 may send a one-time passcode to the mobile device of the proxy owner, and rely on receiving the passcode from the owner, in order to verify the proxy and/or ownership thereof. The participant 104A.1 then, submits the proxy, at 306, to the proxy service client 106A.1, for registration in the proxy directory of the database 110A.1 (which is specific to the participant 104A.1). In connection therewith, the proxy service client 106A.1 stores the proxy in the proxy directory in database 110A.1 at a proxy reference address and updates the local registry, at 308, to indicate the proxy being included in the proxy directory.

At 310, the proxy service client 106A.1 of the participant 104A.1 then requests proxy registration from the proxy service core 102.1. The proxy service core 102.1 updates, at 312, a local registry of proxies in the database 112.1 to include the proxy and the proxy reference address (e.g., where the proxy may include a phone number such as +441123456789 and where the proxy reference address may include, for example, @Participant 104B.1 or http:// proxylookup.participant104B1.co.uk, etc.; etc.), and thereafter confirms the update of the core registry is complete. In connection therewith, the value stored in the reference address may be the actual web address or a named reference. The routing rules herein may resolve the named reference in the "participant service" into the actual web address (whereby, if the web address changes, such change may not impact the stored data).

The proxy service core 102.1 then provides, at 314, a proxy registration response to the proxy service client 106A.1, which indicates the update of the local registry in the proxy service core 102.1 (and generally, the registration of the proxy). In response, the proxy service client 106A.1 provides, at 316, a proxy registration response to the proxy owner, which indicates the proxy is registered and ready to be used.

Figure 4:
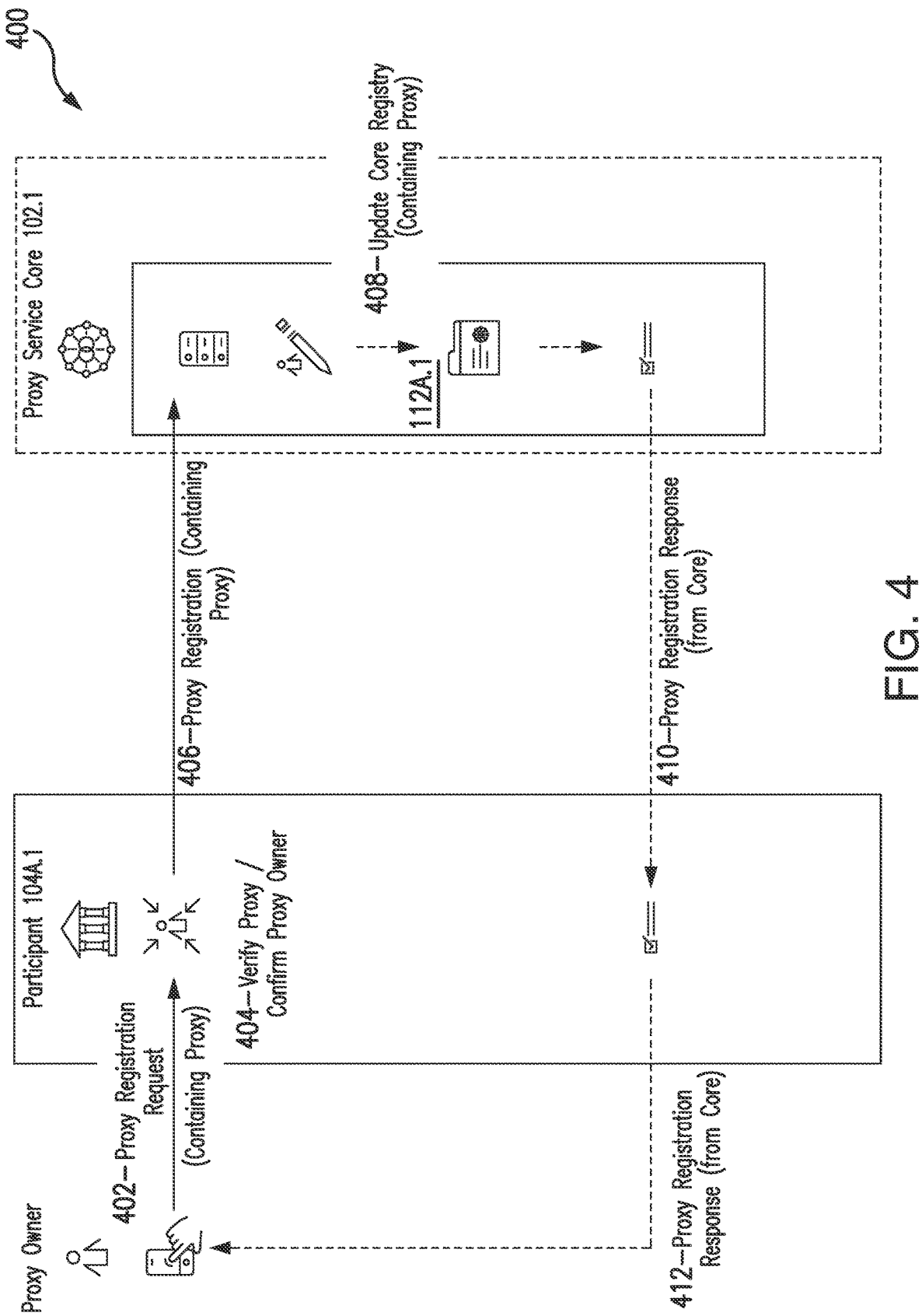
FIG. 4 illustrates another example method, which may be implemented in connection with the system of FIG. 1, for use in registering a proxy for an account.

FIG. 4 illustrates an example method 400 for use in registration of a proxy for an account, (which is generally an alternative to the method 300). The example method 400 is described as implemented in system 100, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 400.

As shown, in this example registration process, the proxy owner requests a proxy to be linked to the account, at 402. The participant 104A.1 verifies the proxy and confirms the owner of the proxy, at 404 (e.g., in a similar manner as described for method 300, etc.). Once verified, the participant 104A.1 then submits the proxy, at 406, to the proxy service core 102.1, in a request for registration of the proxy.

At 408, the proxy service core 102.1 updates a registry of proxies in the database 112.1 to include the proxy and account (whereby the proxy is registered with the account details for the account), and thereafter confirms the update of the core registry is complete. The proxy service core 102.1 then provides, at 410, a proxy registration response to the participant 104A.1, which indicates the update of the registry in the proxy service core 102.1 (and generally, the registration of the proxy). In response, the participant 104A.1, at 412, transmits a proxy registration response to the proxy owner (or user), which indicates the proxy is registered and ready to be used.

Figure 5:
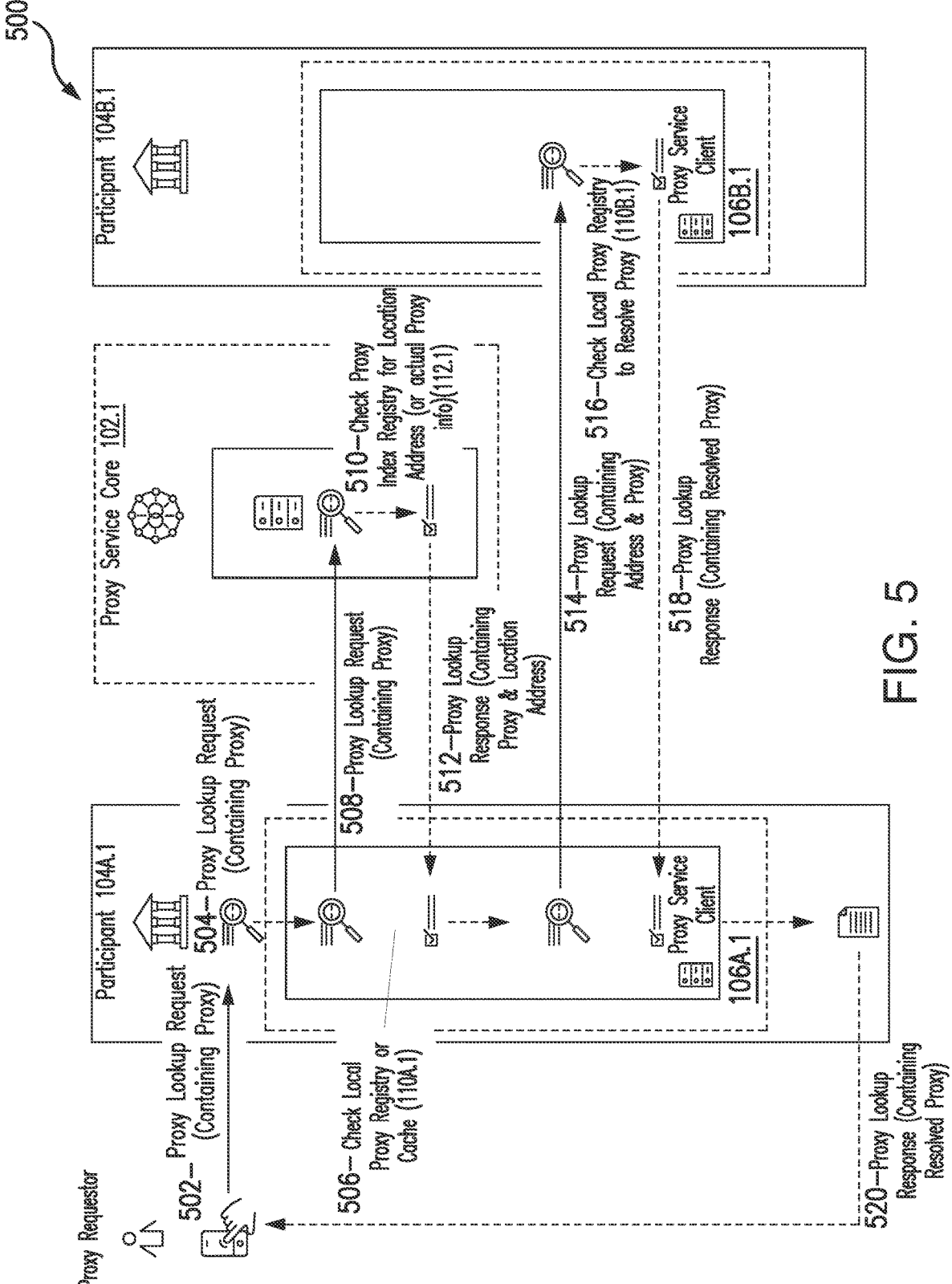
FIG. 5 illustrates an example method, which may be implemented in connection with the system of FIG. 1, for retrieving account data based on a proxy.

FIG. 5 illustrates an example method 500 for use in retrieving account data based on a registered proxy (e.g., as registered through the method 300 or the method 400, etc.). The example method 500 is described as implemented in system 100, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 500.

Initially in method 500, a proxy requestor submits, at 502, a proxy lookup request to the participant 104A.1 (e.g., a request for data corresponding to the proxy, etc.). The proxy requestor may include, for example, a merchant with which a user is performing a transaction, or a bank or associated application (e.g., a mobile banking application, etc.), which intends to initiate a transaction, etc. That said, the proxy requestor may be another participant in the system 100 of FIG. 1, for example, or other user or party apart from those illustrated in FIG. 1.

In response to the proxy lookup request, the participant 104A.1 provides, at 504, the proxy lookup request, with the proxy (or the proxy alone), to the proxy service client 106A.1. The proxy service client 106A.1, in turn, checks, at 506, whether the proxy is included in the local proxy directory in the database 110A.1, or potentially, in a local cache memory based on a recent lookup of the proxy. If not present, the proxy service client 106A.1 proceeds to submit, at 508, a proxy lookup request, including the proxy, to the proxy service core 102.1.

The proxy service core 102.1 checks for the proxy, at 510, in the local registry, and returns a proxy reference address for the proxy, when the proxy is registered and managed by one of the participants (e.g., the participant 104B.1 in this example, etc.). At 512, the proxy service core 102.1 returns a proxy lookup response to the proxy service client 106A.1. The proxy service core 102.1 may optionally sign the proxy lookup address, or other part of the proxy lookup response, with a certificate and/or key specific the proxy service core 102.1 (e.g., with a private key specific to the proxy service core 102.1, etc.). Whether identified in the local registry (or cache memory) or received from the proxy service core 102.1, the proxy lookup response includes an identification of the participant 104B.1 (as managing the proxy, for example), either included in the proxy reference address or separate therefrom.

In turn, the proxy service client 106A.1 identifies the participant 104B.1 (from the proxy lookup response) and submits a proxy lookup request to the participant 104B.1 (and in particular, the proxy service client 106B.1), at 514. The request includes the proxy and also the proxy reference address (signed or not signed). As applicable, the proxy service client 106B.1 may verify the proxy lookup request, by verifying a signature on the request, or the proxy reference address included therein, with a certified public key of the participant 104A.1 (or a certified public key of the proxy service core 102.1, as appropriate), or otherwise. At 516, then, the proxy service client 106B.1 checks the proxy directory for the proxy at the proxy reference address. When confirmed, the proxy service client 106B.1 retrieves the account data associated with the proxy, which is the resolved proxy, and provides, at 518, a proxy lookup response with the resolved proxy, to the proxy service client 106A.1.

The proxy service client 106A.1, then, provides, at 520, directly or via the participant 104A.1, the proxy lookup response, including the resolved proxy (or the requested/corresponding account data), to the proxy requestor. Thereafter, the proxy requestor may initiate a transaction to the account associated with the account data. Alternatively, in some examples, the proxy service client 106B.1 may provide (directly or via the participant 104B.1) the proxy lookup response, including the resolved proxy (or the requested/corresponding account data), to the proxy requestor.

Figure 6:
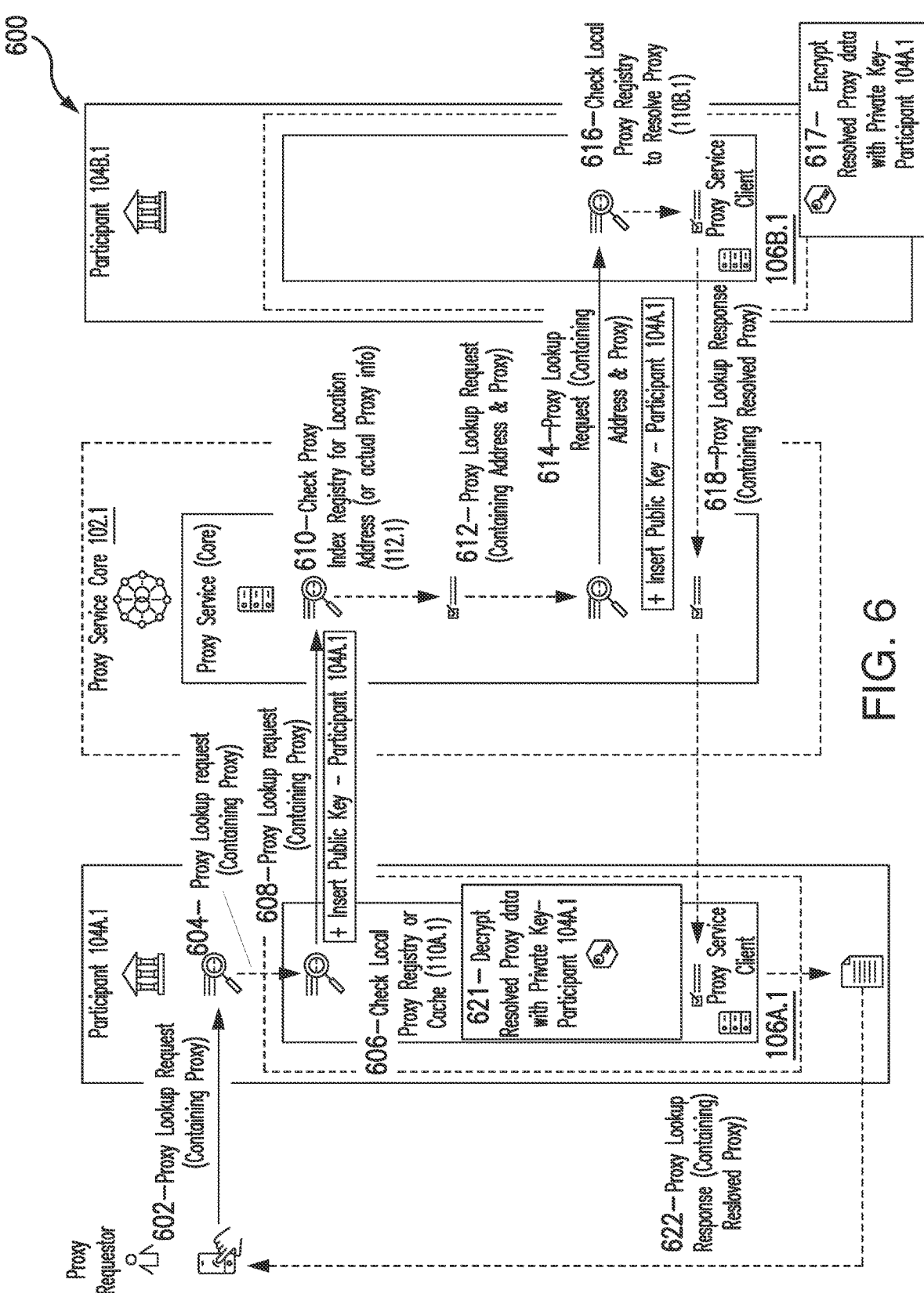
FIG. 6 illustrates another example method, which may be implemented in connection with the system of FIG. 1, for retrieving account data based on a proxy.

FIG. 6 illustrates another example method 600 for use in retrieving account data based on a proxy. The example method 600 is described as implemented in system 100, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 600.

Initially, in method 600, the proxy requestor submits, at 602, a proxy lookup request to the participant 104A.1. The proxy lookup request includes the proxy, which is expected and/or known to be linked to an account by one or more other participants (e.g., in a proxy directory in a database, etc.).

In response to the proxy lookup request, the participant 104A.1 provides, at 604, the proxy lookup request, with the proxy (or the proxy alone), to the proxy service client 106A.1. The proxy service client 106A.1, in turn, checks, at 606, whether the proxy is included in the local proxy directory in the database 110A.1, or potentially, in a local cache memory based on a recent lookup of the proxy. If not present, the proxy service client 106A.1 proceeds to submit, at 608, a proxy lookup request, including the proxy, to the proxy service core 102.1.

Upon receipt, the proxy service core 102.1, in turn, checks, at 610, for a proxy reference address for the proxy in the local registry in the database 112.1. Next, at 612, the proxy service core 102.1 identifies the participant 104B.1 as the owner of the proxied account and submits a proxy lookup request to the proxy service client 106B.1, at 614. The proxy lookup request includes the proxy and also the proxy reference address. At 616, the proxy service client 106B.1 checks the proxy directory (e.g., in database 110B.1, etc.) for the proxy at the proxy reference address. When confirmed, the proxy service client 106B.1 retrieves the account data associated with the proxy, which is the resolved proxy, and provides, at 618, a proxy lookup response with the resolved proxy (e.g., the requested account data, etc.), to the proxy service core 102.1.

The proxy service core 102.1 provides the proxy lookup response, at 620, to the proxy service client 106A.1. The proxy service client 106A.1 then provides, at 622, directly or via the participant 104A. 1, for example, the proxy lookup response to the proxy requestor. Thereafter, the proxy requestor may initiate a transaction to the account associated with the account data, for instance, included in the proxy lookup response.

Optionally, as illustrated in FIG. 6, encryption may be employed to secure the resolved proxy or the account data, for example, from the participant 104B.1 and/or the proxy service core 102.1. For example, the participant 104A.1 may be associated with a public-private key pair, which work together to encrypt and decrypt data. The key pair may be originated with the proxy lookup request, or already exist in the system 100, for example. In connection with method 600, the proxy service client 106A.1 may insert the public key for the participant 104A.1 in the proxy lookup request, at 608, whereby the public key is carried through to the participant 104B.1. Alternatively, the proxy service core 102.1 may insert the public key for the participant 104A.1 in the proxy lookup request, at 614, whereby the public key is carried through the participant 104B.1.

In this example, then, where encryption is employed, when the proxy is resolved to retrieve the account data, the participant 104B.1 (or the proxy service client 106B.1) uses the received public key to encrypt, at 617, the account data and then includes the encrypted account data in the response provided at 618. Upon receipt of the response, the participant 104A.1 (or the proxy service client 106A.1) is then able to decrypt the account data, at 621, using the private key corresponding to the public key (used for encryption). The decrypted account data is then provided to the proxy requestor, at 622.

As a further option in the method 600, in addition to encryption, the proxy service core 102.1 may compile a trail stack, which identifies a trail of the participants, proxy service clients, proxy service cores, etc., involved in receipt of and responding to a proxy lookup request. For example, in connection with method 600, at 604, the proxy service client 106A.1 may identify the proxy requestor (e.g., the requestor ABC, etc.) and append a sequence stack entry for the requestor (which is attached to the proxy lookup request), and then, at 610, the proxy service core 102.1 may append a further sequence stack entry for the proxy service client 106A.1. Similarly, the proxy service client 106B.1 identify the proxy service core 102.1 and append a further sequence stack entry for the proxy lookup request. At this point, the stack indicates a path from the proxy requestor to the participant 104B.1. The stack is used in this example to direct the proxy lookup response back, through the proxy service core 102.1, to the participant 104A.1 in FIG. 6. That is, upon receipt of a proxy lookup request, the participants, proxy service clients, and proxy service core may rely on the trail stack to understand where the proxy lookup request is from and what needs to be done (e.g., where to send the proxy lookup request/reply, etc.). The trail stack may continue to be appended with entries to reflect the entire path of the proxy lookup request and response for the proxy. An example stack is illustrated in Table 1 below.

TABLE 1

| requestor ABC |
| participant 104A.1 |
| proxy service client 106A.1 |
| proxy service core 102.1 |
| proxy service client 106B.1 |
| proxy service core 102.1 |
| proxy service client 106A.1 |
| participant 104A.1 |
| requestor ABC |

The trail stack may include more data, including, for example, the content of the proxy lookup request/response, in one or more embodiments. The trail stack may further be stored by one or more of the proxy service clients and/or the proxy service core as an audit log or record for the request from the proxy requestor. In this manner, if a challenge is instituted against a transaction (which utilized the proxy services herein), that was originally based on a proxy lookup, the system 100, as a whole or in parts, may provide a record of the interaction leading to the presentment of the account data used in the transaction.

It should be appreciated that in addition to the trail stack, the proxy lookup request/response may still further include a unique identifier, which is maintained throughout the path, so that each of the proxy service clients, proxy service core and the participants are able to link the proxy lookup request/response to prior action(s), if any, and track the proxy lookup request/response, etc.

Figure 7:
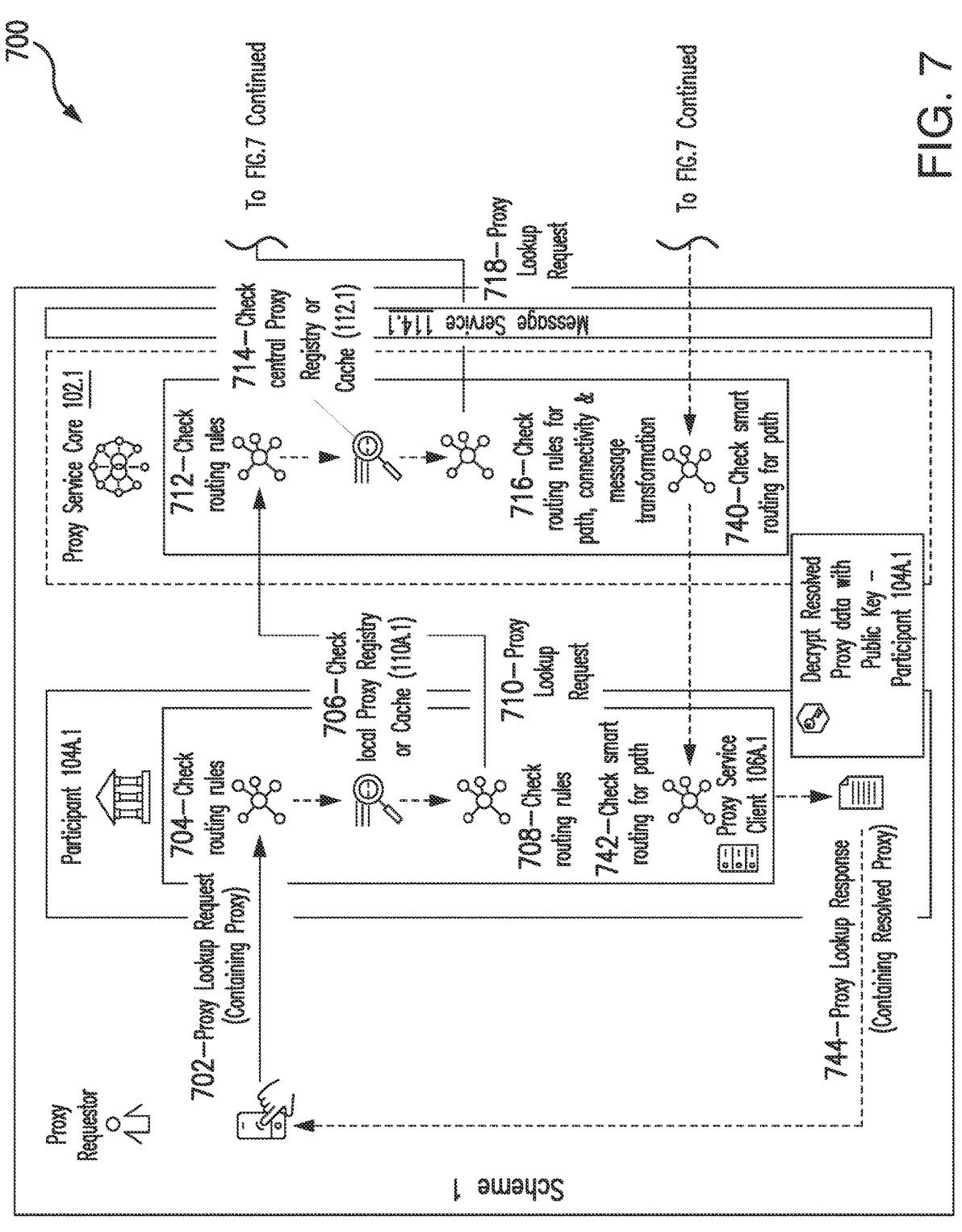
FIG. 7 illustrates another example method, which may be implemented in connection with the system of FIG. 1, for retrieving account data based on a proxy across multiple schemes.
Figure 7:
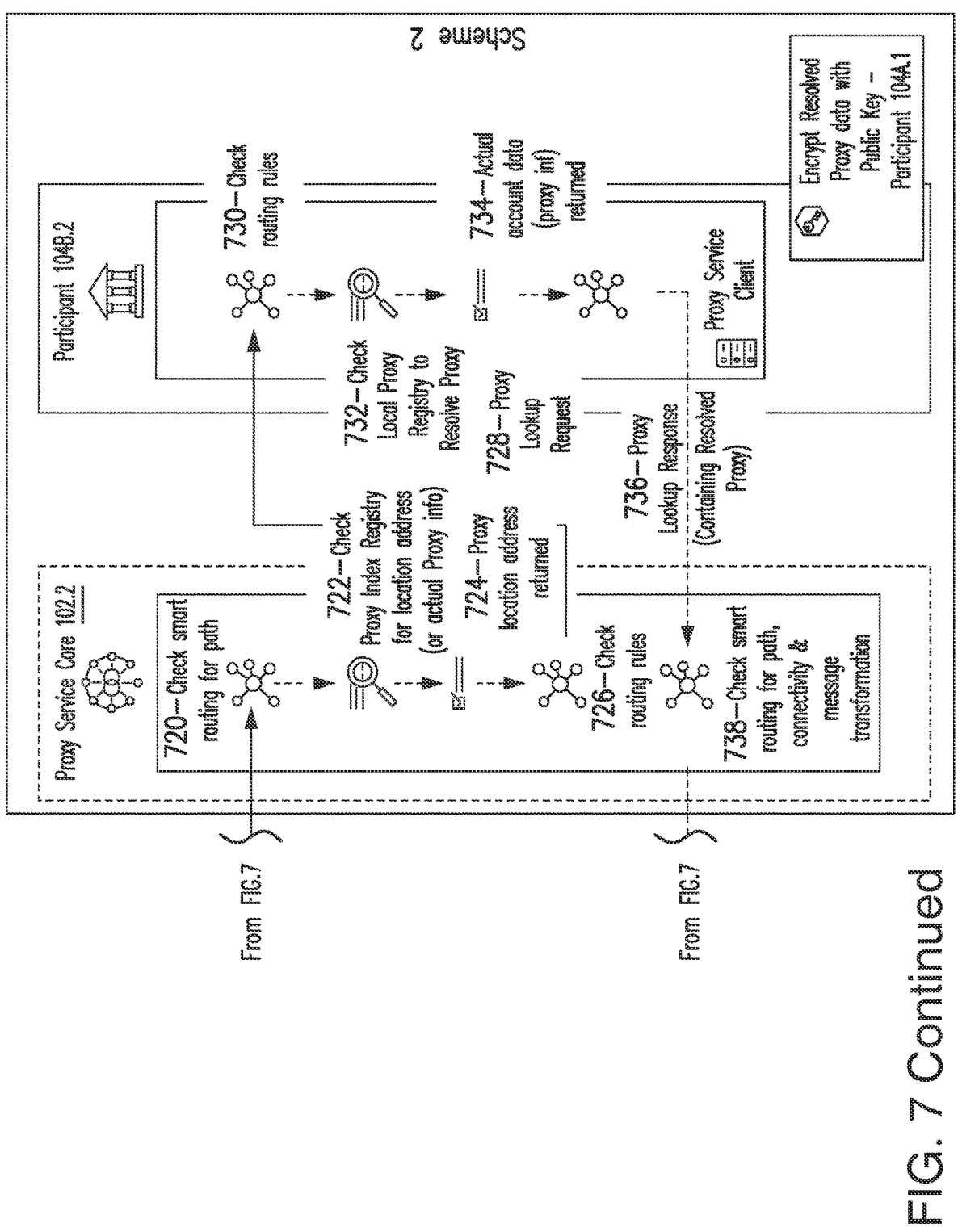

FIG. 7 illustrates another example method 700 for use in retrieving account data based on a proxy across multiple schemes. The example method 700 is described as implemented in system 100, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 700.

At the outset, in method 700, interactions are presented between the participant 104A.1 in SCHEME.1 and the participant 104B.2 in SCHEME.2, as illustrated by the shading (and also as illustrated in FIG. 1). It should be appreciated that the method 700 may be applicable and/or associated with other pairs of participants in different schemes, without limitation.

Initially, the proxy requestor submits, at 702, a proxy lookup request to the participant 104A.1. The proxy lookup request includes the proxy, which is expected and/or known to be linked to an account by one or more other participants.

In response to the proxy lookup request, the participant 104A.1 provides the proxy lookup request, with the proxy (or the proxy alone), to the proxy service client 106A.1, and the proxy service client 106A.1, in turn, checks, at 704, routing rules to the proxy lookup request. The routing rules may include any suitable logic to respond to the proxy lookup request. For example, a routing rule may include, initially, that the local registry (or proxy directory) be first searched for the proxy. Alternatively, the routing rules may examine or analyze a content and/or format of the proxy included in the proxy lookup request. For example, where SCHEME.1 is specific to the United States, a mobile phone number starting with +44 is understood to not be a U.S. specific phone number, whereby, at least initially, searching the local registry may be omitted. What's more, the specific content/format, may inform which scheme may be initially checked. In the above example, +44 is the country code for the United Kingdom, whereby a scheme associated with the United Kingdom may ultimately be checked for the proxy. It should be appreciated that various routing rules, and even trends in prior and existing proxy lookup requests/response, may be relied on by the proxy service client 106A.1 to promote efficiency in responding to the proxy requestor with the specific account data requested.

In this example, as shown in FIG. 7, the proxy service client 106A.1 checks, at 706, the local registry and also the cache memory (for recent requests), based on the routing rules. If the proxy is present, the proxy service client 106A.1 is permitted to return the account data associated with the proxy, as later described with reference to step 744. However, if not present, the proxy service client 106A.1 checks the routing rules, at 708, and based thereon, submits the proxy lookup request to the proxy service core 102.1, at 710.

The proxy service core 102.1 checks the routing rules for the proxy lookup request, at 712. Like above, the routing rules may indicate a specific action, based on the mere receipt of the proxy lookup request, or may indicate an action based on the content/format of the proxy included in the proxy lookup request (or potentially, based on the proxy service client 106A.1 (from which the request is received), etc.), etc. In this example, the proxy service core 102.1 initially checks, at 714, the local registry therein for the proxy, as either registered or in the local directory, for example (and also the local cache memory). If present (as in method 600, for example), the proxy service core 102.1 may respond accordingly. If not present, as here, the proxy service core 102.1 checks the routing rules, at 716. The routing rules, in this example, rely on the content/format of the proxy to identify the proxy service core 102.2 as the appropriate recipient, and also any transformation associated with communicating with the proxy service core 102.2. The proxy service core 102.1 then submits, at 718, the proxy lookup request to the proxy service core 102.2. As shown in FIG. 7, the proxy lookup request is passed through the message service 114.1, whereby the service performs any necessary, desired or expected transformation of the proxy lookup request into one or more formats, etc. The transformation, if any, may be based on the recipient of the request (e.g., the proxy service core 102.2, etc.) and/or path or channel by which the request is submitted. For example, when submitted along a payment rail between the two proxy service cores 102, the proxy lookup request may be transformed to comply with an ISO standard format, such as, for example, the ISO 2022 format, etc.

It should be appreciated that the proxy service core 102.1, at 718, may broadcast the proxy lookup request to multiple different proxy service cores in various schemes. In particular, when the proxy is not apparently associated with a single proxy service core (e.g., based on the routing rules, etc.), the proxy service core 102.1 may broadcast the proxy lookup request to available proxy service cores in different schemes, or to a select group of proxy service cores based on the content/format of the proxy and/or the proxy lookup request (or originator of the request) (and one or more routing rules). As such, the description of the proxy service core 102.2 in this example may be indicative of any of the proxy service cores in receipt of the proxy lookup request. In connection with the above, where each of the schemes, and associated proxy service cores 102, is representative of different regions (e.g., countries (e.g., the United States, the United Kingdom, India, etc. in the example above in the system 100; etc.), broadcast of the proxy lookup request to the different schemes may provide a regional, global, etc. interoperability for lookup of an unidentified proxy (e.g., a global proxy scheme, etc.).

It should be further appreciated that the message service 114.1 may transform or otherwise alter the proxy lookup request for each of the proxy service cores, as required or desired, to the specific formats, etc., of the particular proxy service core.

With continued reference to FIG. 7, the proxy service core 102.2 checks the routing rules for the proxy lookup request, at 720. Like above, the routing rules may indicate a specific action, based on the mere receipt of the proxy lookup request, or may indicate an action based on the content/ format of the proxy included in the proxy lookup request (or potentially, based on the proxy service core 102.1 (from which the proxy lookup request is received), etc.), etc. In this example, the proxy service core 102.2 checks, at 722, the local core registry for the proxy, as either registered or in the local directory, for example (and also the local cache memory). If not present, the proxy service core 102.2 may respond with an error or not present message to the proxy service core 102.1. Conversely, if present in the local core registry of the proxy service core 102.2, as here, the proxy service core 102.2 retrieves the proxy reference address from the local core registry, at 724, and again checks the routing rules, at 726. Based on the routing rules, the proxy service core 102.2 submits the proxy lookup request, at 728, to the participant 104B.2, and specifically, the proxy service client associated therewith. The proxy lookup request, as transmitted, includes the proxy and also the proxy reference address.

Next, as applicable, the proxy service client associated with the participant 104B.2 checks, at 730, the routing rules, which may specify one or more actions based on the content/format of the proxy, or data associated with the proxy lookup request, etc. In connection therewith, the proxy service client (associated with the participant 104B.2) may verify the proxy lookup request from the proxy service core 102.2, by one or more techniques. In this example, at 732, the proxy service client (associated with the participant 104B.2) checks or searches the proxy directory for the proxy. The proxy service client (associated with the participant 104B 0.2) retrieves the account data linked and/or associated with the proxy, which is the resolved proxy, at 734, and provides a proxy lookup response with the resolved proxy, to the proxy service core 102.2, at 736.

The proxy service core 102.2 checks the routing rules for the proxy lookup response and submits, at 738, the proxy lookup response to the proxy service core 102.1 (e.g., via a message service of the SCHEME 2, as necessary or desired). The proxy service core 102.1, in turn, checks the routing rules for the proxy lookup response and submits, at 740, the proxy lookup response to the proxy service client 106A.1. The proxy service client 106A.1 then checks the routing rules for the proxy lookup response, at 742, and submits the proxy lookup response, directly or via the participant 104A. 1, for example, to the proxy requestor, at 744. Thereafter, the proxy requestor may initiate a transaction to the account associated with the account data returned via the proxy lookup request.

It should be appreciated, consistent with the description above, that the participants, proxy service clients, proxy service cores, included in the method 700, may compile, optionally, a trail stack for the proxy lookup request as the proxy lookup request moves from the proxy requestor to the participant 104B.2, and back, as the proxy lookup response. The trail stack may then be used, by the participants, proxy service clients, and proxy service cores, in connection with routing rules, to identify where to submit the proxy lookup request/response as described above.

It should also be appreciated that encryption may again be employed, optionally, in the method 700. As shown in FIG. 7, for instance, the encryption may be initiated prior to the proxy service client (associated with the participant 104B.2) submitting the proxy lookup response to the proxy service core 102.2, at 736. Again, only the account data may be encrypted in this example, or the account data and other data may be encrypted in other examples. Consequently, as also illustrated in FIG. 7, the proxy service client 106A.1 decrypts the account data, prior to submitting the same to the requestor, at 744. The encryption key, in this example, which generally includes a public key associated with the proxy service client 106A.1 and/or the participant 104A.1, may be passed along with the proxy lookup request by the proxy service client 106A.1, or by either of the proxy service cores 102.1, 102.2.

Figure 8:
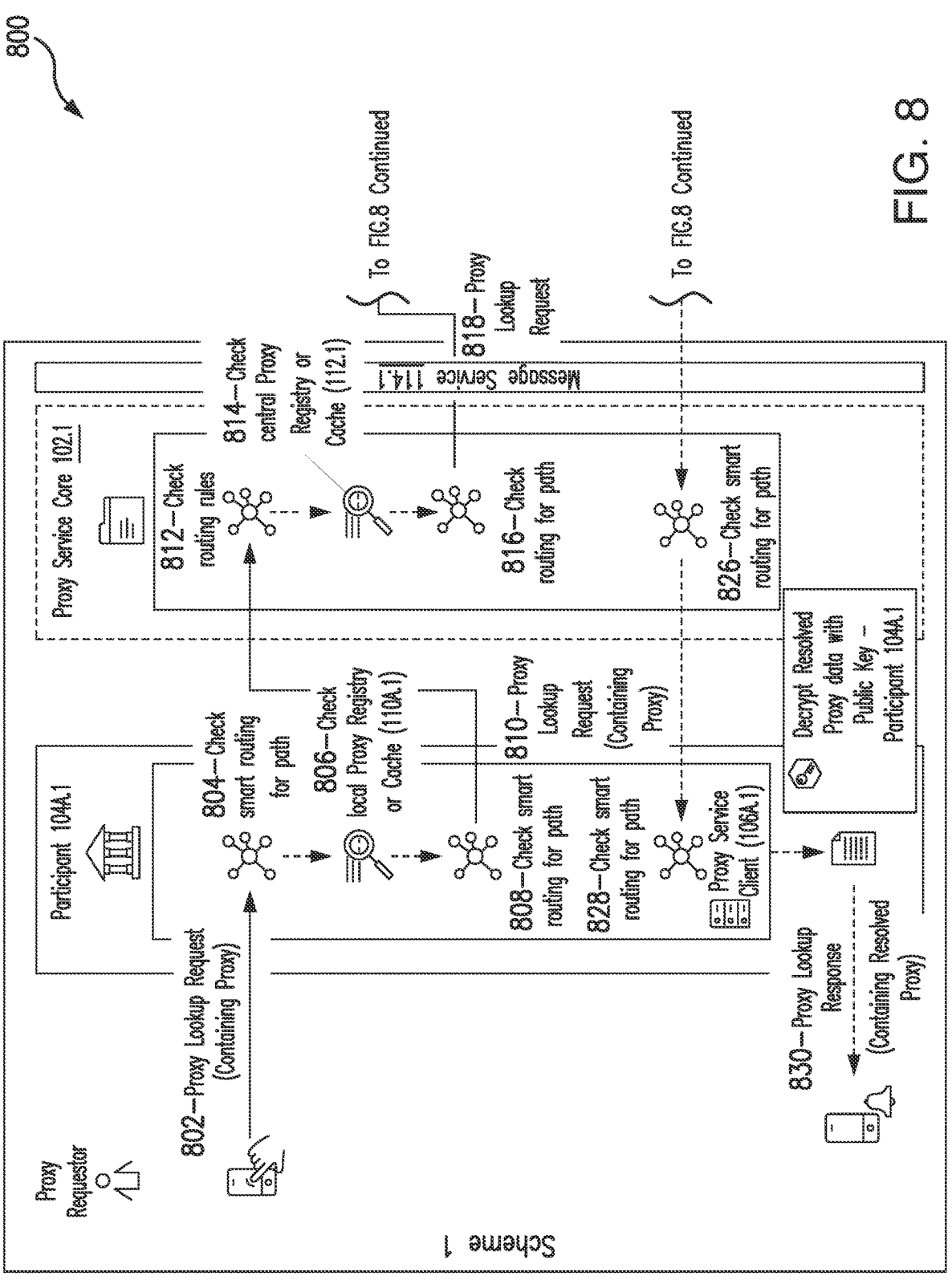
FIG. 8 illustrates another example method, which may be implemented in connection with the system of FIG. 1, for retrieving account data based on a proxy.
Figure 8:
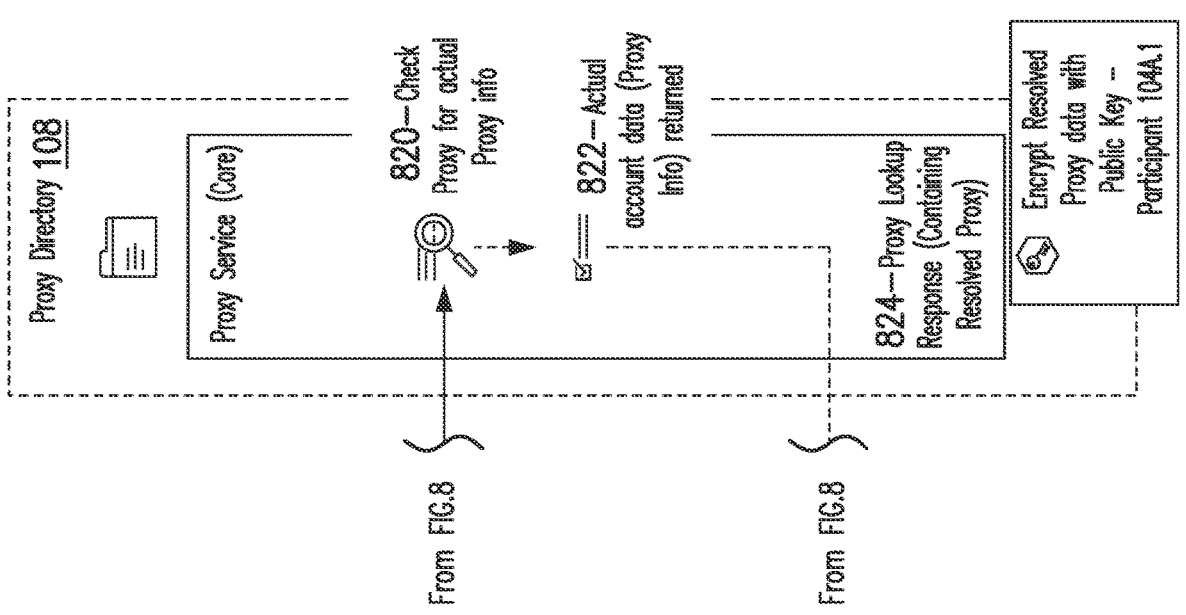

FIG. 8 illustrates another example method 800 for use in retrieving account data based on a proxy. The example method 800 is described as implemented in system 100, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 800.

Similar to method 700, interactions are presented between the participant 104A.1 in SCHEME.1 and the third party proxy directory which is outside of SCHEME.1. It should be appreciated that the method 800 may be applicable and/or associated with other proxy directories associated with the participants and/or third party described herein.

With reference to FIG. 8, initially, at 802, the proxy requestor submits a proxy lookup request to the participant 104A.1. The request includes the proxy, which is expected and/or known to be linked to an account by one or more other participants.

In response to the proxy lookup request, the participant 104A.1 provides the proxy lookup request, with the proxy (or the proxy alone), to the proxy service client 106A.1, and the proxy service client 106A.1, in turn, checks, at 804, routing rules to the proxy lookup request. As described, the routing rules may include any suitable logic to respond to the request. In turn, the proxy service client 106A.1 checks, at 806, the local registry and also the cache memory (for recent proxy lookup requests), based on the routing rules. If the proxy is present, the proxy service client 106A.1 is permitted to return the account data associated with the proxy, as later described with reference to step 830. However, if not present, the proxy service client 106A.1 checks the routing rules, at 808, and based thereon, submits the proxy lookup request to the proxy service core 102.1, at 810.

The proxy service core 102.1 checks the routing rules for the proxy lookup request, at 812. Like above, the routing rules may indicate a specific action, based on the mere receipt of the proxy lookup request, or may indicate an action based on the content/format of the proxy included in the proxy lookup request (or potentially, based on the proxy service client 106A.1 from which the proxy lookup request is received, etc.), etc. In this example, the proxy service core 102.1 initially checks, at 814, the local core registry for the proxy, as either registered or in the local directory, for example (and also the local cache memory). If present, the proxy service core 102.1 may respond accordingly. If not present, as here, the proxy service core 102.1 checks the routing rules, at 816. The routing rules, in this example, provide for identification of the third party directory service 108 for routing of the proxy lookup request. The proxy service core 102.1 then submits, at 818, the proxy lookup request to the third party directory service 108. As shown in FIG. 8, the proxy lookup request is passed through the message service 114.1, whereby the service 114.1 performs any necessary, desired or expected transformation of the proxy lookup request into one or more formats, etc. The transformation, if any, may be based on the recipient of the proxy lookup request (e.g., the third party directory service 108 in this example, etc.) and/or path or channel by which the proxy lookup request is submitted.

Upon receipt of the proxy lookup request, the third party directory service 108 checks, at 820, for the proxy and (if present) retrieves, at 822, the account data associated with the proxy. The third party directory service 108 then compiles and submits, at 824 a proxy lookup response (to the proxy lookup request) to the proxy service core 102.1.

The proxy service core 102.1, in turn, checks the routing rules for the proxy lookup response and submits, at 826, the proxy lookup response to the proxy service client 106A.1. The proxy service client 106A.1 then checks the routing rules for the proxy lookup response, at 828, and submits the proxy lookup response, directly or via the participant 104A.1, for example, to the proxy requestor, at 830. Thereafter, the proxy requestor may initiate a transaction to the account associated with the account data included in the proxy lookup response.

It should be appreciated, again, consistent with the description above, that the participants, proxy service client, proxy service core, and the third party directory, included in the method 800, may (optionally) compile a trail stack for the proxy lookup request as the proxy lookup request moves from the proxy requestor to the third party directory service 108, and back, as a proxy lookup response. In addition, it should be appreciated that encryption may also (optionally) be employed in the method 800, as indicated. The encryption may be initiated prior to the third party directory service 108 submitting the proxy lookup response to the proxy service core 102.1 (at 824), and then, decryption may be initiated by the proxy service client 106A.1, prior to submitting the same to the proxy requestor (at 830). The encryption key used in such encryption, which generally includes a public key associated with the proxy service client 106A.1 and/or the participant 104A.1, may be passed along with the proxy lookup request by the proxy service client 106A.1 or the proxy service core 102.1 to the third party directory service 108, for use in encrypting at least the account data.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example: (a) receiving, from a participant, a proxy lookup request, the proxy lookup request including a proxy; (b) based on one or more routing rules, submitting the proxy lookup request to a second proxy service core computing device; (c) receiving, from the second proxy service core computing device, a proxy lookup response, which includes account data linked to the proxy; and/or (d) returning the proxy lookup response, to the participant, in response to the proxy lookup request.

In addition, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example: (a) receiving, from a second proxy service core computing device, a proxy lookup request, the proxy lookup request including a proxy; (b) checking for the proxy from the proxy lookup request in a local registry; (c) identifying a participant and a proxy reference address; (d) submitting the proxy lookup request and the proxy reference address to the participant; (e) receiving, from the participant, a proxy lookup response, which includes account data linked to the proxy; and/or (f) returning the proxy lookup response, to the second proxy service core computing device, in response to the proxy lookup request.

In addition, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example: (a) receiving, from a participant, a proxy lookup request, the proxy lookup request including a proxy; (b) searching for the proxy from the proxy lookup request in a local registry; (c) retrieving account data for the proxy, as indicated in the local registry; and/or (d) returning a proxy lookup response, to the participant, in response to the proxy lookup request, the proxy lookup response include the retrieved account data for the proxy.

In addition, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example: (a) receiving a proxy lookup request, the proxy lookup request including a proxy; (b) identifying a directory; (c) submitting the proxy lookup request to the directory; (d) receiving, from the directory, a proxy lookup response, which includes account data linked to the proxy; and/or (e) returning the proxy lookup response in response to the proxy lookup request.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in interconnecting proxy directories, the method comprising:

determining, by a proxy service client computing device, a proxy from a proxy lookup request is not included in a local proxy directory and/or local memory of the proxy service client computing device, the proxy service client computing device specific to a participant;

based on the proxy not being included in the local proxy directory and/or the local memory, submitting, by the proxy service client computing device, the proxy lookup request to a first proxy service core computing device;

receiving, by the first proxy service core computing device, from the participant, via the proxy service client computing device, the proxy lookup request;

determining, by the first proxy service core computing device, the proxy from the proxy lookup request is not included in a local registry of the first proxy service core computing device;

based on the proxy not being included in the local registry;

identifying a second proxy service core computing device based, in part, on content of and/or format of the proxy; and submitting, by the proxy service core computing device, the proxy lookup request to the second proxy service core computing device;

receiving, by the first proxy service core computing device, from the second proxy service core computing device, a proxy lookup response, which includes account data linked to the proxy; and returning, by the first proxy service core computing device, the proxy lookup response, to the participant, via the proxy service client computing device, in response to the proxy lookup request.

2. The computer-implemented method of claim 1, wherein identifying the second proxy service core computing device is further based on one or more routing rules.

3. The computer-implemented method of claim 1, further comprising appending, by the first proxy service core computing device, an entry to a trail stack included in the proxy lookup request, the entry indicative of the participant and/or the first proxy service core computing device.

4. The computer-implemented method of claim 1, further comprising appending a public key associated with the participant to the proxy lookup request, thereby permitting another participant to encrypt the account data using the public key, prior to directing the encrypted account data toward the first proxy service core computing device.

5. The computer-implemented method of claim 1, further comprising modifying the proxy lookup request consistent with a defined format, prior to submitting the proxy lookup request to the second proxy service core computing device.

6. The computer-implemented method of claim 1, wherein the first proxy service core computing device is located in a first region and wherein the second proxy service core computer device is located in a second, different region.

7. The computer-implemented method of claim 1, further comprising signing at least a portion of the proxy lookup request and/or at least a portion of the proxy lookup response.

8. The computer-implemented method of claim 1, wherein the proxy includes a phone number;

wherein the account data includes a primary account number, an expiration date, and/or a card verification code; and wherein the account data is encrypted.

9. A system for use in interconnecting proxy directories, the system comprising:

a proxy service client computing device of a participant; and a first proxy service core computing device coupled in communication with the proxy service client computing device;

wherein the proxy service client computing device is configured, by first executable instructions, to:

determine whether a proxy from a proxy lookup request is included in a local proxy directory and/or local memory of the proxy service client computing device;

based on the proxy not being included in the local proxy directory and/or the local memory, submit the proxy lookup request to the first proxy service core computing device; and wherein the first proxy service core computing device is configured, by second executable instructions, to:

receive, from a participant, a proxy lookup request, the proxy lookup request including a proxy;

determine whether the proxy from the proxy lookup request is included in a local registry of the first proxy service core computing device;

based on the proxy not being included in the local registry;

identify a second proxy service core computing device based, in part, on content of and/or format of the proxy; and submit the proxy lookup request to the second proxy service core computing device;

receive, from the second proxy service core computing device, a proxy lookup response, which includes account data linked to the proxy; and return the proxy lookup response, to the participant, in response to the proxy lookup request.

10. The system of claim 9, wherein the first proxy service core computing device is further configured, by the second executable instructions, prior to submitting the proxy lookup request, to identify the second proxy service core computing device further based on one or more routing rules.

11. The system of claim 9, wherein the first proxy service core computing device is further configured, by the second executable instructions, to:

append an entry to a trail stack included in the proxy lookup request, the entry indicative of the participant and/or the first proxy service core computing device; and append a public key associated with the participant to the proxy lookup request, thereby permitting another participant to encrypt the account data using the public key, prior to directing the encrypted account data toward the first proxy service core computing device.

12. The system of claim 9, wherein the first proxy service core computing device is further configured, by the second executable instructions, to modify the proxy lookup request consistent with a defined format, prior to submitting the proxy lookup request to the second proxy service core computing device.

\* \* \* \* \*